United States Patent
Vinue Santolalla et al.

(10) Patent No.: US 8,899,522 B2
(45) Date of Patent: Dec. 2, 2014

(54) AIRCRAFT FUSELAGE WITH HIGH STRENGTH FRAMES

(75) Inventors: Eduardo Vinue Santolalla, Madrid (ES); Diego Folch Cortes, Madrid (ES); Esteban Martino Gonzalez, Madrid (ES); Enrique Guinaldo Fernandez, Salamanca (ES); Pablo Goya Abaurrea, Madrid (ES)

(73) Assignee: Airbus Operations, S.L., Madrid (ES)

( * ) Notice: Subject to any disclaimer, the term of this patent is extended or adjusted under 35 U.S.C. 154(b) by 438 days.

(21) Appl. No.: 13/229,927

(22) Filed: Sep. 12, 2011

(65) Prior Publication Data

US 2012/0248247 A1 Oct. 4, 2012

(30) Foreign Application Priority Data

Mar. 30, 2011 (ES) .................................. 201130497

(51) Int. Cl.
*B64C 1/06* (2006.01)
*B64C 1/12* (2006.01)
(52) U.S. Cl.
CPC .. *B64C 1/064* (2013.01); *B64C 1/12* (2013.01)
USPC .......................................... 244/119; 244/131
(58) Field of Classification Search
USPC ........ 244/117 R, 119, 120, 131; 52/245, 246, 52/474, 664, 665, 655.1
See application file for complete search history.

(56) References Cited

U.S. PATENT DOCUMENTS

| | | | | |
|---|---|---|---|---|
| 2,389,767 A * | 11/1945 | Dalton | ....................... | 52/506.06 |
| 3,071,217 A * | 1/1963 | Gould | ........................... | 52/403.1 |
| 3,976,269 A * | 8/1976 | Gupta | ............................. | 244/119 |
| 4,425,980 A * | 1/1984 | Miles | ........................... | 181/208 |
| 5,242,523 A | 9/1993 | Willden et al. | | |
| 6,766,984 B1 * | 7/2004 | Ochoa | ............................. | 244/119 |
| 7,134,629 B2 * | 11/2006 | Johnson et al. | ............... | 244/119 |
| 7,716,835 B2 * | 5/2010 | Johnson et al. | ............... | 29/897.2 |
| 7,963,477 B2 * | 6/2011 | Soula et al. | ................... | 244/1 A |

(Continued)

FOREIGN PATENT DOCUMENTS

DE 10 2004 035 170 B3 8/2005
DE 102007029500 A1 * 1/2009

(Continued)

OTHER PUBLICATIONS

International Search Report and Written Opinion issued Oct. 16, 2012 in PCT/ES2012/070202 filed Mar. 26, 2012.

(Continued)

*Primary Examiner* — Joseph W Sanderson
(74) *Attorney, Agent, or Firm* — Oblon, Spivak, McClelland, Maier & Neustadt, L.L.P.

(57) ABSTRACT

A fuselage section of an aircraft includes a skin, a plurality of frames positioned transversely to a longitudinal axis of a fuselage of the aircraft, and a plurality of longitudinal stringers at least one of which is configured with a closed transversal section including a stringer hat, two stringer webs, and two stringer feet joined to the skin. At least one of the frames is configured in at least one sector with a frame foot joined to the skin, a frame web having holes at crossing zones with the stringers, a frame cap, and a frame cap extension which does not interfere with the stringers. The frames are joined to, at least, the stringer hats at crossing zones of the frames and the stringer hats.

11 Claims, 4 Drawing Sheets

(56) References Cited

U.S. PATENT DOCUMENTS

| | | | |
|---|---|---|---|
| 8,038,099 B2* | 10/2011 | Anast et al. | 244/119 |
| 8,480,030 B2* | 7/2013 | Stephan | 244/119 |
| 8,490,920 B2* | 7/2013 | Karem | 244/119 |
| 2005/0263645 A1* | 12/2005 | Johnson et al. | 244/119 |
| 2008/0251636 A1* | 10/2008 | Soula et al. | 244/1 A |
| 2009/0121081 A1* | 5/2009 | Karem | 244/119 |
| 2009/0272846 A1* | 11/2009 | Anast et al. | 244/120 |
| 2010/0272954 A1* | 10/2010 | Roming et al. | 428/138 |
| 2010/0308165 A1* | 12/2010 | Markowski et al. | 244/119 |
| 2011/0001010 A1* | 1/2011 | Tacke et al. | 244/131 |
| 2012/0132756 A1* | 5/2012 | Roming et al. | 244/131 |
| 2012/0248247 A1* | 10/2012 | Vinue Santolalla et al. | 244/119 |

FOREIGN PATENT DOCUMENTS

| | | |
|---|---|---|
| FR | 1.345.076 A | 12/1963 |
| FR | 2906008 A1 * | 3/2008 |
| WO | WO 2009000734 A2 * | 12/2008 |

OTHER PUBLICATIONS

Spanish Search Report issued Mar. 20, 2013 in Patent Application No. 201130497 with English language translation of categories of cited documents.

U.S. Appl. No. 13/339,897, filed Dec. 29, 2011, Gonzalez, et al.

* cited by examiner

AIRCRAFT FUSELAGE WITH HIGH STRENGTH FRAMES

FIELD OF THE INVENTION

The present invention refers to an aircraft fuselage and more particularly to an aircraft fuselage with high strength frames.

BACKGROUND OF THE INVENTION

The aeronautical industry requires structures which, on the one hand, support the loads to which they are subjected fulfilling high stiffness and resistance demands and, on the other hand, are as light as possible. A consequence of this requirement is the continuously expanding use of composite materials in primary structures because, by conveniently applying these materials, an important weight reduction can be achieved compared with structures designed with metallic materials.

The composite materials that are most used in the aeronautical industry consist of fibers or fiber bundles embedded in a matrix of thermosetting or thermoplastic resin, in the form of a preimpregnated or "prepreg" material. Its main advantages refer to:

- Their high specific strength with respect to metallic materials. It is the strength/weight equation.
- Their excellent behaviour under fatigue loads.
- The possibilities of structural optimization thanks to the anisotropy of the material and the possibility of combining fibers with different orientations, allowing the design of the elements with different mechanical properties adjusted to the different needs in terms of applied loads.

As is well known, the main structural elements of aircraft fuselages are the skin, the frames and the stringers. The skin is stiffened longitudinally with stringers to reduce the skin thickness, making it more competitive in terms of weight, while the frames avoid the overall instability of the fuselage and can be subjected to the introduction of local loads. Other structural elements can be found inside an aircraft fuselage, such as beams, which act as a frame for open sections of the fuselage or which are used to withstand the loads introduced by the cabin floor of the aircraft.

The fuselage structure made out of composite materials which is nowadays more commonly used consists, on the one hand, of a skin with integrated stringers, co-bonded or co-cured, and on the other hand, of complete or floating frames which are manufactured separately and which are then riveted to the fuselage skin. The document U.S. Pat. No. 5,242,523 describes a structure such as this one combining the use of omega-shaped stringers with C-shaped frames.

Omega-shaped stringers have been widely used in fuselages in the past few years because they have a high inertia and can provide support and stability to a great skin panel due to its geometry. These characteristics, along with the advantages it presents for its manufacture, due to the simplification and reduction of the tooling, and therefore of cost, make its use in the reinforcement of fuselage skins very interesting.

Regarding frames both open and closed section frames have been proposed for fuselages. Open section shaped frames such as the frames used in U.S. Pat. No. 5,242,523 are indeed convenient from a manufacturing point of view although require high stabilized webs while closed section shaped frames, such omega-shaped frames, that have a higher strength, raise manufacturing problems.

The present invention focuses on finding a solution for these drawbacks.

SUMMARY OF THE INVENTION

It is an object of the present invention to provide a highly resistant aircraft fuselage structure.

It is another object of the present invention to provide a highly resistant aircraft fuselage structure fully made of a composite material that allows a manufacturing simplification.

These and other objects are met by a fuselage section of an aircraft whose structure comprises a skin, a plurality of frames positioned transversely to the longitudinal axis of the fuselage and a plurality of longitudinal stringers configured with a closed transversal section comprising a hat, two webs and two feet joined to the skin, in which:

said frames are configured in at least one its sectors with a foot joined to the skin, a web (at an angle with the foot comprised between 90° and 170°) having holes at the crossing zones with said stringers, a cap and a cap extension (at an angle with the cap comprised between 90° and 170°) which does not interfere with the stringers;

said frames are joined to, at least, the stringer hats at their crossing zones.

In embodiments of the present invention said frames also comprise a second foot extending from said cap extension that is joined to the stringer hats at their crossing zones. Therefore it is provided a fuselage structure using a combination of open section shaped frames with closed section shaped stringers that provides a highly resistant framework.

In embodiments of the present invention said frames are joined to the stringer caps at their crossing zones using angular plates so that one of its sides is joined to the cap extensions of the frames and the other side is joined to the stringer hats. Therefore it is provided a fuselage structure using a combination of open section shaped frames with closed section shaped stringers that simplifies the fuselage manufacturing.

In embodiments of the present invention said frames are joined to the stringers at their crossing zones using intermediate fittings having a side that is joined to the cap extensions of the frames and flanges or feet that are joined, respectively, to the stringer webs or feet. Therefore it is provided a fuselage structure using a combination of open section shaped frames with closed section shaped stringers that provides a reinforced joining between frames and stringers.

In embodiments of the present invention the cap extensions of said frames include connecting parts with the stringer hats at their crossing zones and said connecting parts include connecting extensions that are joined to the stringer hats. Therefore it is provided a fuselage structure using a combination of open section shaped frames with closed section shaped stringers where the configuration of the frames include the connecting parts with the stringer hats.

In embodiments of the present invention, the bonding between the stringer feet and the skin is reinforced by means of rivets at the stringer sections where the frames are joined to the stringer hats. Therefore it is provided a fuselage structure using a combination of open section shaped frames with closed section shaped stringers avoiding debonding risks between stringers and skin due to the frame loading introduction on the stringers.

In embodiments of the present invention the frame webs and/or the frame caps have a curved or corrugated shape. Therefore it is provided a fuselage structure using a combination of open section shaped frames with closed section shaped stringers improving the buckling strength of the frames.

In embodiments of the present invention said skin, said frames and said stringers are made of a composite material. Therefore it is provided a fuselage structure using a combination of open section shaped frames adapted to the features of the composite material for, particularly, reducing manufacturing costs.

Other characteristics and advantages of the present invention will be clear from the following detailed description of embodiments illustrative of its object in relation to the attached figures.

DESCRIPTION OF THE DRAWINGS

FIG. 5a is a partial lateral view of FIG. 4 and FIGS. 5b, 5c and 5d are transversal views by sections A-A, B-B, C-C of FIG. 5a.

FIG. 7a is a partial lateral view of FIG. 6 and FIGS. 7b, 7c and 7d are transversal views by sections A-A, B-B, C-C of FIG. 7a.

DETAILED DESCRIPTION OF THE INVENTION

The main structural elements of an aircraft fuselage according to this invention are the skin, closed-shaped longitudinal stringers and S-shaped circumferential frames that can be made of metallic or composite materials.

Figure 1A:
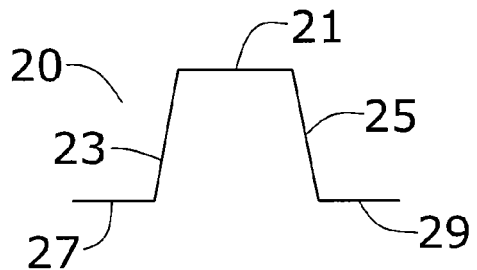
FIGS. 1a and 1b show, respectively, schematic transversal sections of two closed-shaped stringers.
Figure 1B:
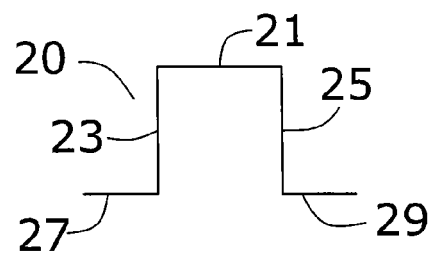
Figure 2A:
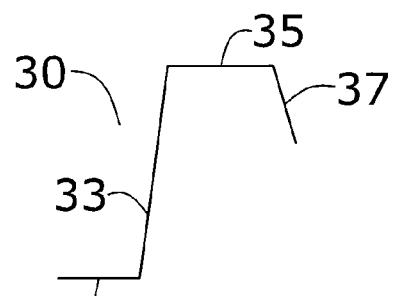
FIGS. 2a and 2b show, respectively, schematic transversal sections of two S-shaped frames according to the present invention.
Figure 2B:
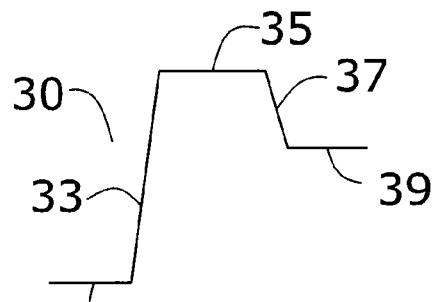

Within the meaning of this invention a close-shaped stringer is a stringer 20 having a closed transversal section, as the omega-shaped section shown in FIG. 1a or the Π-shaped section shown in FIG. 1b, configured by a hat 21, two webs 23, 25 and two feet 27, 29 to be joined to the skin of the fuselage, and an S-shaped frame is a frame 30 having a semi-closed transversal section configured as shown in FIG. 2a by a foot 31 to be joined to the skin 10, a web 33 at an angle with the foot 31 comprised between 90° and 170°, a cap 35 and a cap extension 37 at an angle with the cap comprised between 90° and 170°. It can also include a second foot 39 further to the cap extension 37 as shown in FIG. 2b.

Figure 3:
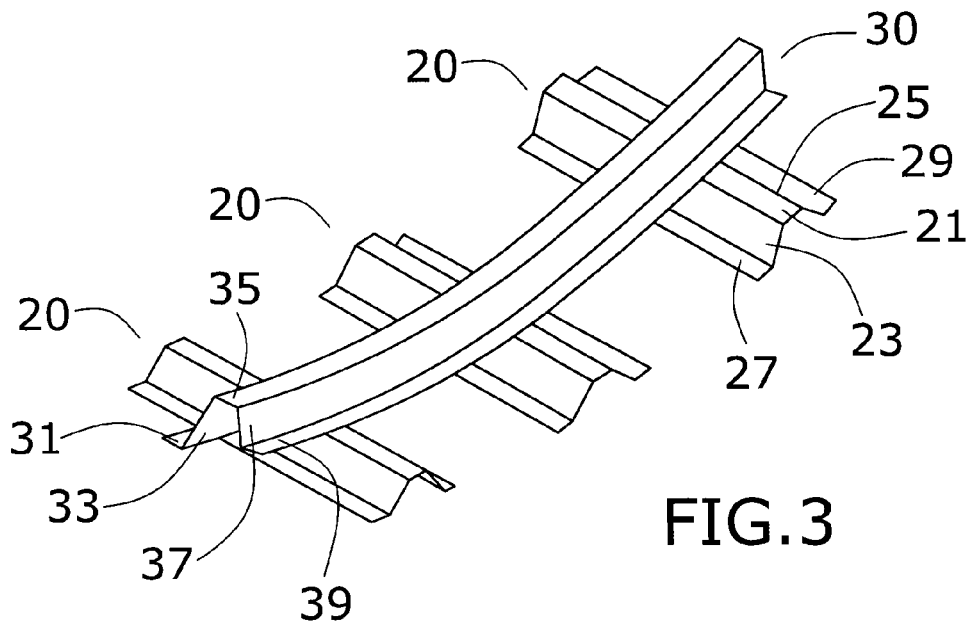
FIG. 3 is a schematic perspective view of an embodiment of the assembly between closed-shaped stringers and S-shaped frames in an aircraft fuselage according to this invention.

One embodiment of the invention is shown in FIG. 3 where the frames 30 and the stringers 20 are dimensioned so that, among other requirements, the frames 30 are joined to the stringers hats 21 through the frames second foot 39.

Figure 4:
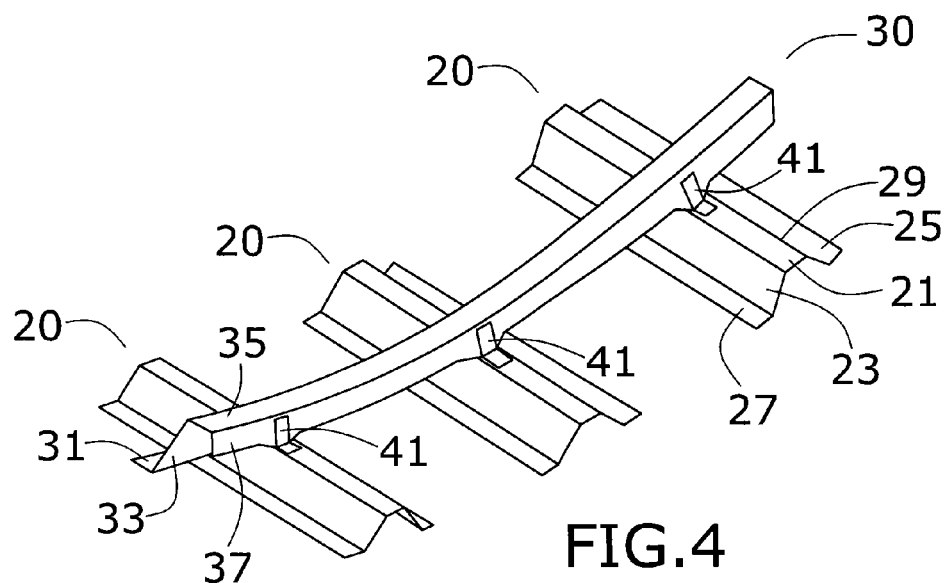
FIG. 4 is a schematic perspective view of another embodiment of the assembly between closed-shaped stringers and S-shaped frames in an aircraft fuselage according to this invention.

Another embodiment of the invention is shown in FIGS. 4 and 5 where the frames 30 and stringers 20 are dimensioned so that, among other requirements, the frames 30 are joined to the stringer hat 21 through intermediate angular parts 41 with a side joined to the frame cap extensions 37 and the other side joined to the stringer hat 21.

FIGS. 5a to 5d illustrate in detail the intersection between a frame 30 and a stringer 20 with, among others, the following features in said intersection:
  the frame webs 33 have mouse holes 34 for the stringers 20;
  the frame feet 31 has joggles 32 so that it can mount over the stringer feet 27, 29;
  the frame cap extensions 37 have protrusions 38 to receive one side of said angular part 41.

Figure 5A:
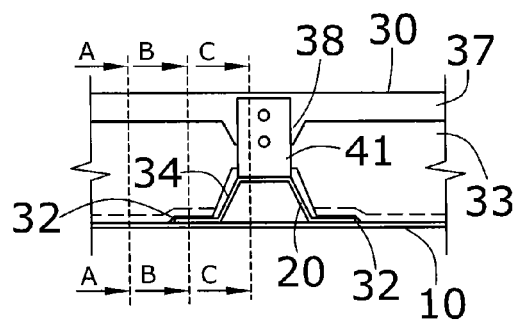
Figure 5B:
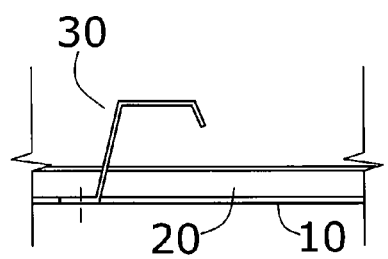
Figure 5C:
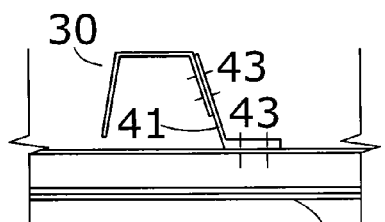
Figure 5D:
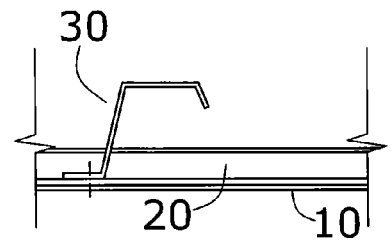

The joining means between the frame cap extensions 37/the stringer hats 21 and the intermediate plates 41 can be rivets 43 as shown in FIG. 5c or adhesive means.

Figures 8A, 8B:
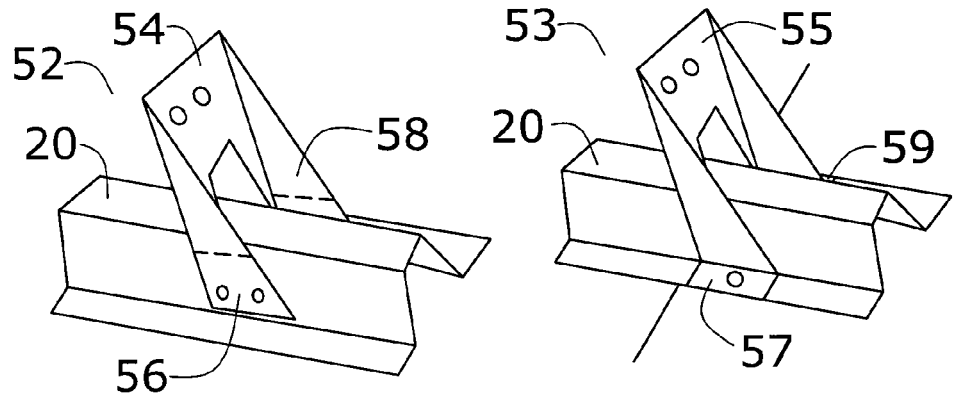
FIGS. 8a and 8b show fittings that can be used in the embodiment of FIG. 4.

Instead of using the intermediate angular parts 41, the joining between frames 30 and stringer 20 can be made by means of fittings 52, 53, shown in FIGS. 8a and 8b, with a planar side 54, 55 to be joined to the frame cap extensions 37 and flanges 56, 58/feet 57, 59 to be joined to the stringer webs 23, 25/stringer feet 27, 29.

Figures 9A, 9B:
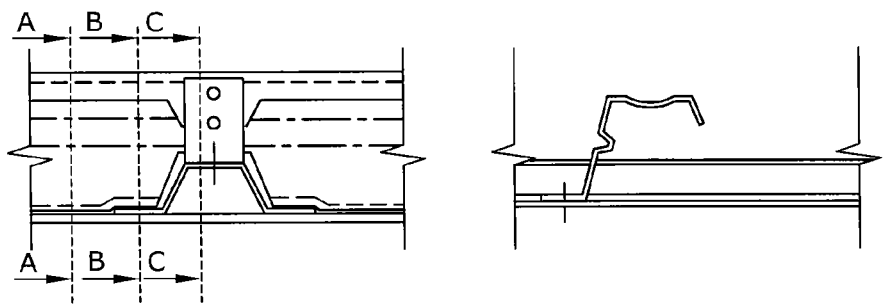
FIGS. 9a-9d are identical to FIGS. 5a-5d with the exception that the frame include corrugations in the web and in the cap and reinforcing rivets between the stringers and the skin.
Figures 9C, 9D:
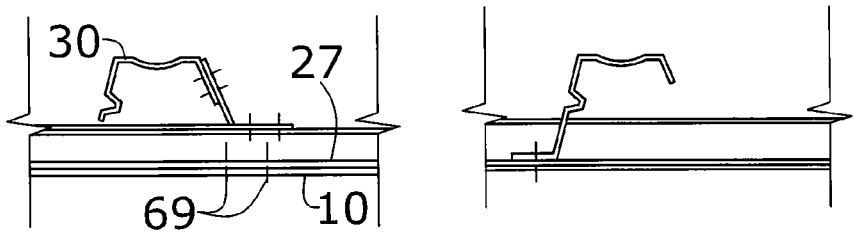

FIGS. 9a-9d show a parallel embodiment to the embodiment shown in FIGS. 5a-5d where the frame web 33 and the frame cap 35 have corrugated shapes for improving its buckling strength. They can also have also curved shapes for the same purpose. In FIG. 9c there can be seen rivets 69 joining the stringer foot 27 to the skin 10 at an stringer section where a frame 30 is joined to an stringer hat 21 to reduce the possible debonding of stringer 20 and skin 10 due to frame loading introduction on stringer. These reinforcement may be applicable to all the embodiments of this invention.

Figure 6:
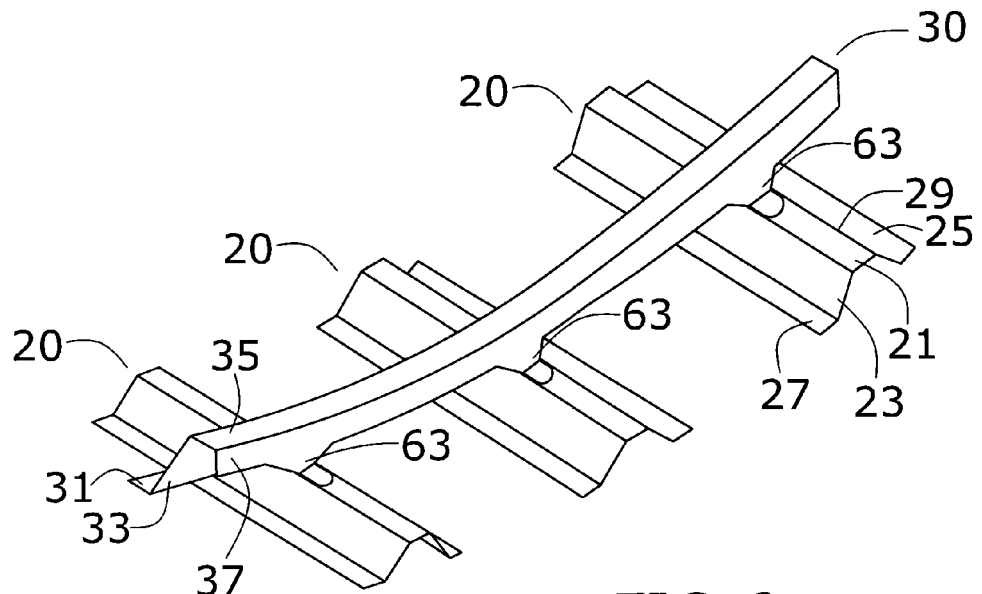
FIG. 6 is a schematic perspective view of another embodiment of the assembly between closed-shaped stringers and S-shaped frames in an aircraft fuselage according to this invention.
Figure 7A:
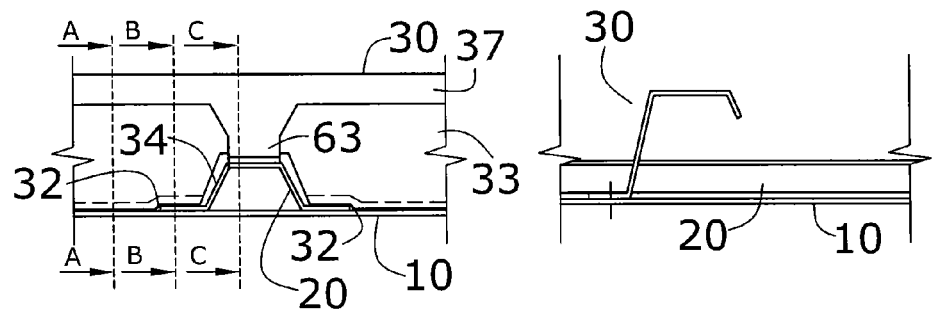
Figure 7B:
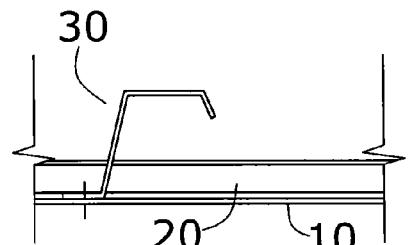
Figure 7C:
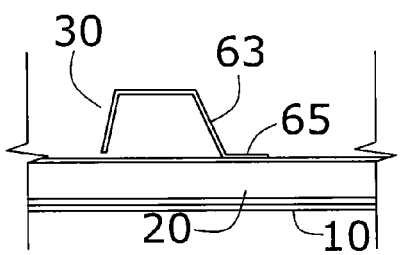
Figure 7D:
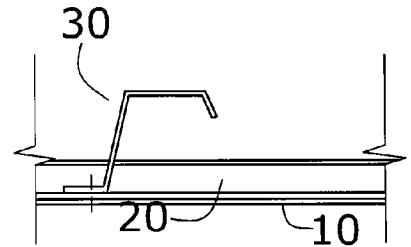

Another embodiment of the invention shown is in FIGS. 6 and 7 where the frames 30 and stringers 20 are dimensioned so that, among other requirements, the frames 30 are joined to the stringer hats 21 through connecting parts 63 integrated on the frames 30.

FIGS. 7a to 7d illustrate in detail the intersection between a frame 30 and a stringer 20 with, among others, the following features in said intersection:
  the frame webs 33 have mouse holes 34 for the stringers 20;
  the frame feet 31 has joggles 32 so that it can mount over the stringer feet 27, 29;
  the frame cap extensions 37 have connecting parts 63 with connecting extensions 65 to be joined to the stringer hats 21.

The joining means between said connecting horizontal extensions 65 and the stringer hats 21 can be bonding means or rivets.

Among others, this invention has the following advantages:
  S-frames have higher strength than conventional open section frames. They allow bigger inertia frames by means of higher height frames with longer webs auto stabilized. The corrugated shape improves its buckling behavior.
  No need to add complex radial stiffener because S-shaped frames have an increased warping strength due to the inclination of the frames web and to the cap extensions that are supported by the stringers, avoiding lateral displacements.
  S-shaped frames have lighter weight than omega-shaped frames (only one full web, only one mouse hole needed).
  S-shaped frames with open section have an improved accessibility for inspection, maintenance and assembly with respect to omega-shaped frames with closed section.

S-shaped frames with only one foot to be joined to the skin allow easier installation and assembly at manufacturing, reducing the time needed for riveting or bonding tasks.

S-shaped frames allow improvements in the manufacturing of frames, particularly in the de-moulding step.

S-shaped frames allow the possibility of including fittings inside a pair of frames for punctual loads introduction on fuselage as at horizontal and vertical tail plane attachments.

Although the present invention has been fully described in connection with preferred embodiments, it is evident that modifications may be introduced within the scope thereof, not considering this as limited by these embodiments, but by the contents of the following claims.

The invention claimed is:

1. A fuselage section of an aircraft, comprising:
 a skin,
 a plurality of frames positioned transversely to a longitudinal axis of a fuselage of the aircraft, and
 a plurality of longitudinal stringers at least one of which is configured with a closed transversal section comprising a stringer hat, two stringer webs, and two stringer feet joined directly to the skin, wherein
 at least one of said frames is configured in at least one sector with a frame foot joined to the skin, a frame web having holes at crossing zones with said stringers, a frame cap, and a frame cap extension which does not interfere with the stringers; and
 said frames are joined directly to, at least, the stringer hats at crossing zones of the frames and the stringer hats.

2. The fuselage section according to claim 1, wherein:
 at least one of said frames also comprises a second foot extending from said cap extension; and
 said second foot is joined to the stringer hats at crossing zones of the second foot and the stringer hats.

3. The fuselage section according to claim 1, wherein said frames are joined to the stringer hats at the crossing zones of the frames and the stringer hats using angular plates so that one side of the angular plates is joined to the cap extensions of the frames and another side of the angular plates is joined to the stringer hats.

4. The fuselage section according to claim 1, wherein:
 the cap extensions of said frames include connecting parts with the stringer hats at crossing zones of the cap extensions and the stringer hats; and
 said connecting parts include connecting extensions that are joined to the stringer hats.

5. The fuselage section according to any of claims 1-3 and 4, wherein bonding between the stringer feet and the skin is reinforced by rivets at stringer sections where the frames are joined to the stringer hats.

6. The fuselage section according to claim 1, wherein at least the frame webs have a curved or corrugated shape.

7. The fuselage section according to claim 1, wherein at least the frame caps have a curved or corrugated shape.

8. The fuselage section according to claim 1, wherein an angle between the frame feet and the frame webs is comprised between 90° and 170°.

9. The fuselage section according to claim 1, wherein an angle between the frame caps and the frame cap extensions is comprised between 90° and 170°.

10. The fuselage section according to claim 1, wherein said skin, said frames, and said stringers are made of a composite material.

11. The fuselage section according to claim 1, wherein the frame web and the frame cap extension are attached to opposite ends of the frame cap, and the frame web and the frame cap extension both extend obliquely relative to the frame cap.

* * * * *